INVENTOR.
Bruno Loeffler,

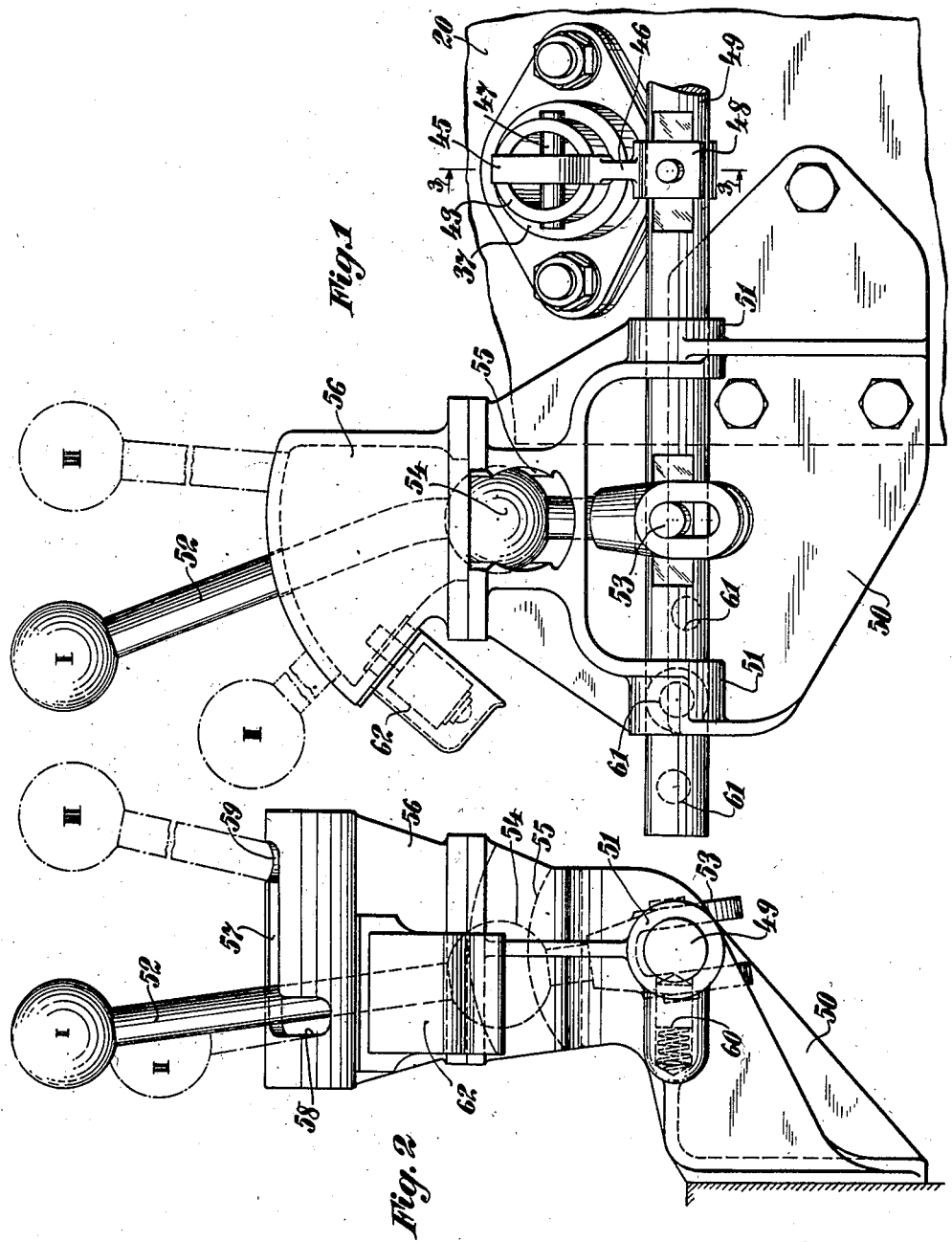

Jan. 12, 1937. B. LOEFFLER 2,067,612
AIR CHAMBER VALVE OPERATING MECHANISM AND CONTROL FOR DIESEL ENGINES
Filed Oct. 11, 1935 3 Sheets—Sheet 3
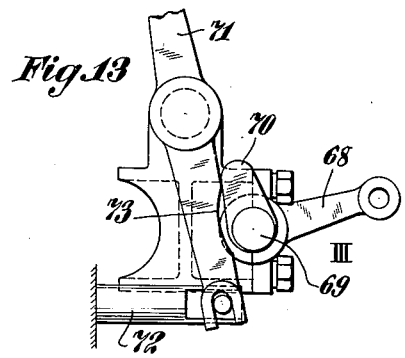
Fig.13
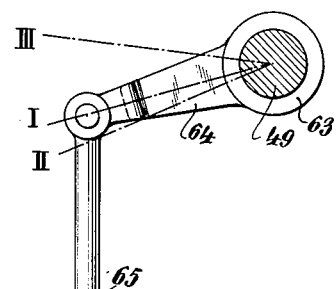
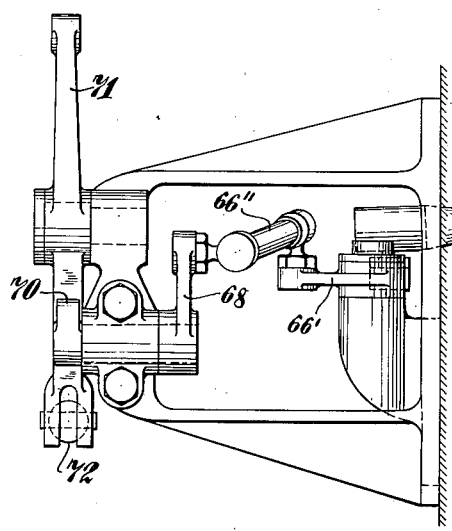
Fig.10
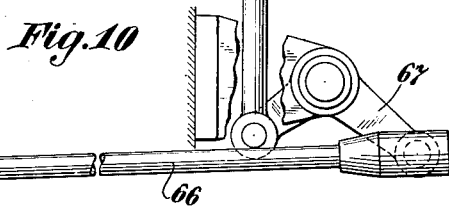
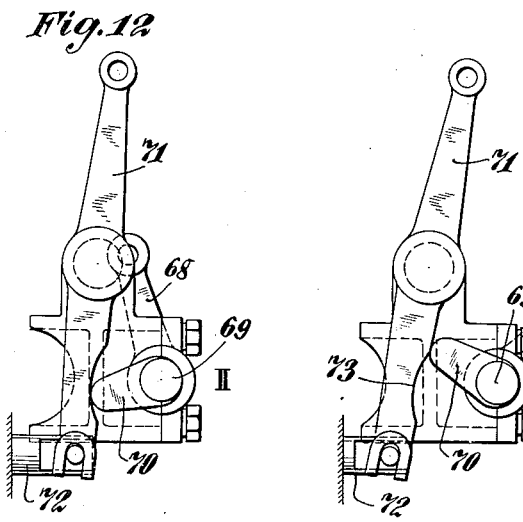
Fig.12
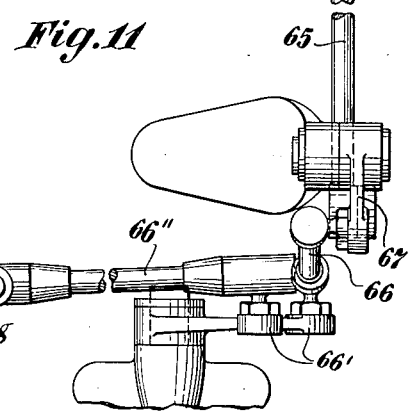
Fig.11
INVENTOR.
Bruno Loeffler,
BY Hoguet, Neary & Campbell,
HIS ATTORNEYS Patented Jan. 12, 1937

2,067,612

UNITED STATES PATENT OFFICE 2,067,612

AIR CHAMBER VALVE OPERATING MECHANISM AND CONTROL FOR DIESEL ENGINES

Bruno Loeffler, Plainfield, N. J., assignor to International Motor Company, New York, N. Y., a corporation of Delaware Application October 11, 1935, Serial No. 44,508

2 Claims. (Cl. 137—139)

The present invention relates to mechanisms for controlling the air chamber valve operating mechanism of Diesel engines and embodies, more specifically, an improved form of such mechanism by means of which a plurality of air chamber valve operating means may be properly controlled from a relatively remote point.

More particularly, the invention relates to control mechanisms of the above character wherein the mechanism is particularly well suited for operating a plurality of valves in such fashion that each of the valves may be effectively seated in a plurality of positions.

Accordingly, an object of the invention is to provide a remote control mechanism by means of which a plurality of air chamber valves on a Diesel engine may be effectively controlled.

A further object of the invention is to provide a control mechanism of the above character wherein means is incorporated for positively and effectively closing each of a plurality of valves in a plurality of positions, the common operating mechanism being controlled from a remote station.

Further objects of the invention will be apparent as it is described in greater detail in connection with the construction shown in the accompanying drawings, wherein—

Figure 1 is a view in side elevation, showing a control mechanism for a valve operating structure constructed in accordance with the present invention;

Figure 2 is a view in end elevation, showing the mechanism of Figure 1;

Figure 10 is a view in end elevation, showing the interlock mechanism by means of which the fuel pump control member is prevented from operation during the cranking operation of the engine;

Figure 11 is a plan view of the elements shown in Figure 10, the position of the elements in Figure 11 corresponding to the cranking position of the valve;

Figure 12 is a view similar to Figure 11, showing the locking mechanism in the starting position; and Figure 13 is a view similar to Figure 11, showing the locking mechanism in the normal running position.

Figure 3:
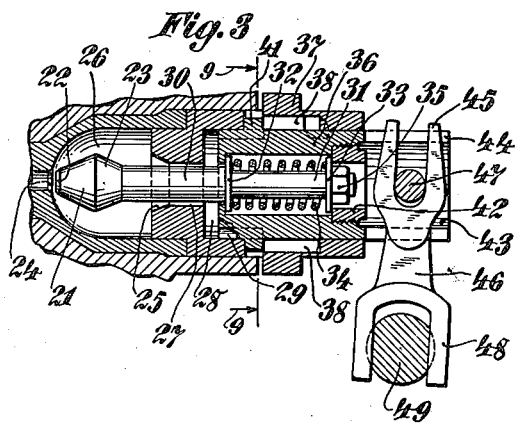
Figure 3 is a view in section, taken on a plane indicated by the lines 3—3 of Figures 1 and 4, and looking in the direction of the arrows. In this figure, the valve is in the cranking position.
Figure 4:
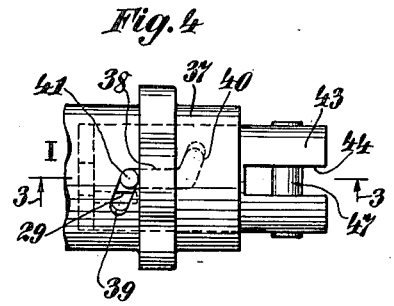
Figure 4 is a plan view of the valve operating mechanism of Figure 3.

With reference to the above drawings, an engine is illustrated at 20 and is provided with a plurality of air chamber valves 21 (Figure 3), these valves being formed with valve seats 22 and 23 for engaging valve ports 24 and 25, respectively. Valve port 24 provides communication with an air chamber 26, port 25 establishing communication between the said air chamber and a duct 27 which communicates with the atmosphere through chamber 28 and passages 29.

The valve is mounted on a valve stem 30 which is formed with a reduced portion 31, at the ends of which washers 32 and 33 are provided. A spring 34 normally urges the washers apart, washer 33 being seated by means of a nut 35.

The washers 32 and 33, together with the reduced portion 31 of the valve stem, are received within a sleeve 36 which is slidably mounted within a cylindrical bushing 37, carried by the valve and chamber structure. In the cylindrical bushing 37 are formed one or more axially extending grooves 38 which terminate at the inner end thereof in grooves 39 and, at the outer ends thereof, in grooves 40. Grooves 39 and 40 preferably are angularly disposed with respect to transverse planes through the axis of the valve mechanism in order that a jamming action may be provided by means of lugs 41 which are formed on the sleeve 36 to engage the said grooves.

An internal nut 42 is provided for locating the washer 33 within the cylindrical member 36 and a slotted cylindrical extension 43 is formed on the cylindrical member 36, the member 43 being slotted at 44 to receive the bifurcated extremity 45 of an operating lever 46. A shaft 47 is secured between the opposite sides of the extension 43 to be engaged by the bifurcated lever 46 in order that the sleeve 36 may be moved axially as well as rotatably.

The other end of lever 46 is bifurcated at 48 to engage an operating shaft 49 which is journaled in a bracket 50 by means of bearings 51. The shaft 49 is operated by means of a lever 52 which has a pin and slot connection 53 with the shaft 49, the lever being fulcrumed by means of a ball 54 which is received within an arcuate guide 55, preferably formed in the bracket 50. A cover plate 56 may be provided for the fulcrumed mounting of the lever 52, this plate being formed with a slot having sections 57, 58 and 59. Motion of the lever 52 in the slot section 57 causes the shaft 49 to be moved axially, while motion of the lever in the slot sections 58 and 59 causes the shaft to be rocked in opposite directions. A spring pressed detent 60, adapted to engage suitably positioned recesses 61 in the shaft 49, serves to hold the shaft 49 in any valve operating positions in which it has been moved. Moreover, in order that operation of the starting motor may be prevented when the valves are in idling and running positions, an electrical switch 62 is provided to be engaged by the lever 52 when in the cranking position thereof in order that the starting motor circuit may be closed.

Figure 5:
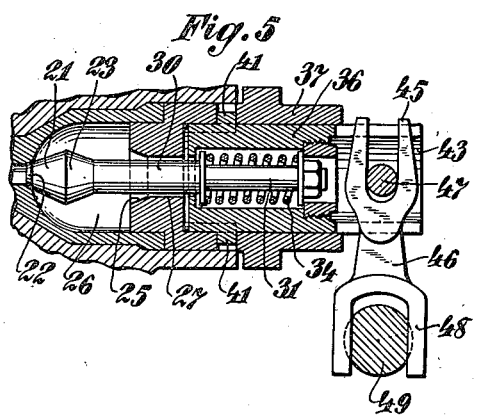
Figure 5 is a view in section, taken on line 5—5 of Figure 6, and looking in the direction of the arrows, this view illustrating the mechanism when the valve is seated in the starting position.
Figure 6:
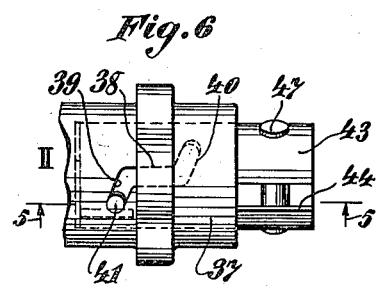
Figure 6 is a plan view of the mechanism shown in the position illustrated by Figure 5.

When the lever 52 is in the position indicated by the Roman numeral I in Figures 1 and 2, the valve is in the position illustrated in Figure 3, at which time decompression is afforded and the cranking operation of the engine facilitated. Motion of the lever 52 from the first position into the second position indicated by the Roman numeral II causes the lever to be moved in the slot 57 and the shaft 49 rocked in a counter clockwise direction as viewed in Figure 3. This causes the lugs 41 to be positioned opposite the grooves 39. Further motion of the lever 52 into the second position causes it to move into the groove portion 58, resulting in axial motion of the shaft 49 and causing the lugs 41 to move into the grooves 39, thus jamming the valve 22 against the port 24. This action is accomplished while spring 34 is being compressed as indicated in Figure 5.

Figure 7:
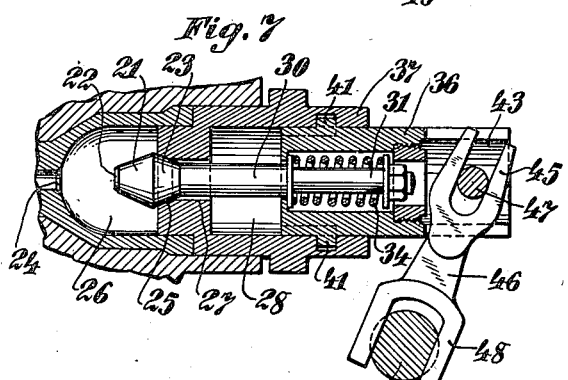
Figure 7 is a view in section, taken on line 7—7 of Figure 8, and looking in the direction of the arrows, this view illustrating a valve mechanism when in normal running position.
Figure 8:
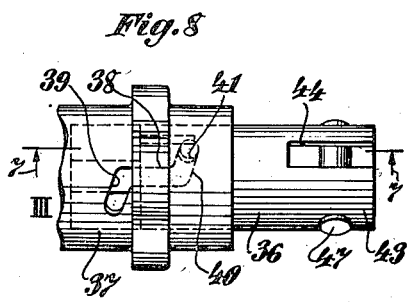
Figure 8 is a plan view showing the elements of Figure 7.
Figure 9:
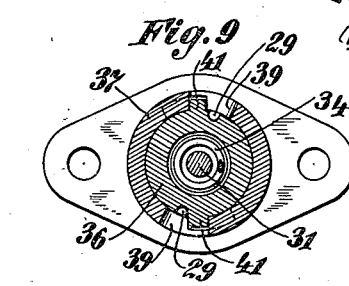
Figure 9 is a view in section, taken on line 9—9 of Figure 3, and looking in the direction of the arrows.

Motion of the lever 52 from its second position to the position indicated by the Roman numeral III in Figures 1 and 2, causes the lugs 41 to enter grooves 40 in an obvious manner, thus jamming the valve 23 against the port 25 and compressing the spring 34 as illustrated in Figure 7.

In order that the fuel pump may be prevented from operating during the cranking position of the valve (the position indicated by Roman numeral I), the shaft 49 is splined to a sleeve 63 which is slidable upon the shaft 49 and provided with an arm 64 which is connected to a link 65. Link 65 operates a link 66″ through a bell crank lever 67, link 66, and bell crank lever 66′, the link 66″ being connected to a lever arm 68 mounted upon a shaft 69 to which a locking arm 70 is secured. Locking arm 70 is adapted to be moved into the path of an operating lever 71 which is connected to the control member 72 of a fuel pump and is manually operated in any suitable fashion. The lever 71 may be provided with a concave portion 73 in which the locking arm 70 may move to accommodate a limited motion of the lever 71 during the idling position (the position indicated by Roman numeral II) of the mechanism. Figure 11 illustrates the locking mechanism when in fully locked position while Figure 12 illustrates the mechanism in the idling position of the engine.

Figure 13 illustrates the locking mechanism during the normal running operation of the engine.

It will thus be seen that an effective interlock is provided between the remote valve operating mechanism and the engine and the fuel pump and starting motor circuit by means of which operation of the engine under predetermined conditions is effectively controlled.

While the invention has been described with specific reference to the construction shown in the accompanying drawings, it is not to be limited, save as defined in the appended claims.

I claim:

1. An air valve for Diesel engines having an air chamber upon opposite sides of which are valve ports and passages, said valve being movable from an intermediate and open position to closed positions against the respective ports, a valve stem for the valve, an operating mechanism, a bushing element fixed on the engine, a sleeve element slidable in the bushing and connected to the valve stem, means to operate the sleeve by the operating mechanism, a groove in one of said elements, said groove having an axially extending portion and angularly extending portions, a lug on the other of the said elements engaging the groove whereby the valve will be locked in each closed position by engagement of the lug with the angularly extending portions of the groove, spaced spring seating washers movable toward each other on the valve stem, a spring between the washers, opposed means on the sleeve to engage the washers, an operating rod, an arm on the rod engaging the sleeve pivotally, and means to move the rod axially and rotatably.

2. An air valve for Diesel engines having an air chamber upon opposite sides of which are valve ports and passages, said valve being movable from an intermediate and open position to closed positions against the respective ports, a valve stem for the valve, an operating mechanism, a bushing element fixed on the engine, a sleeve element slidable in the bushing and connected to the valve stem, means to operate the sleeve by the operating mechanism, a groove in one of said elements, said groove having an axially extending portion and angularly extending portions, a lug on the other of the said elements engaging the groove whereby the valve will be locked in each closed position by engagement of the lug with the angularly extending portions of the groove, spaced spring seating washers movable toward each other on the valve stem, a spring between the washers, opposed means on the valve stem against which the washers are adapted to seat, and opposed means on the sleeve to engage the washers.

BRUNO LOEFFLER.